United States Patent [19]

Hirose et al.

[11] Patent Number: 5,723,396
[45] Date of Patent: Mar. 3, 1998

[54] DIELECTRIC COMPOSITION FOR HIGH FREQUENCIES

[75] Inventors: Eiichirou Hirose; Yoshinori Shinohara; Shinji Sakai, all of Saitama-ken, Japan

[73] Assignee: Mitsubishi Materials Corporation, Tokyo, Japan

[21] Appl. No.: 745,770

[22] Filed: Nov. 8, 1996

[30] Foreign Application Priority Data

| Nov. 10, 1995 | [JP] | Japan | 7-292750 |
| Feb. 19, 1996 | [JP] | Japan | 8-030647 |
| Mar. 28, 1996 | [JP] | Japan | 8-074230 |
| Apr. 24, 1996 | [JP] | Japan | 8-102431 |

[51] Int. Cl.$^6$ ............. C03C 14/00; C04B 35/495
[52] U.S. Cl. ............. 501/135; 501/32; 501/136
[58] Field of Search ............. 501/135, 136, 501/32

[56] References Cited

U.S. PATENT DOCUMENTS

| 4,585,745 | 4/1986 | Tunooka et al. | 501/135 |
| 4,745,093 | 5/1988 | Okawa et al. | 501/135 |
| 4,897,374 | 1/1990 | Matsumoto et al. | 501/135 |
| 5,073,528 | 12/1991 | Matsumoto et al. | 501/135 |

FOREIGN PATENT DOCUMENTS

| 1944017 | 3/1971 | Germany | 501/135 |
| 403263707 | 11/1991 | Japan | 502/135 |

*Primary Examiner*—Deborah Jones
*Attorney, Agent, or Firm*—McAulay Fisher Nissen Goldberg & Kiel, LLP

[57] ABSTRACT

A dielectric composition for high frequencies, which comprises a ceramic component comprising $Sr_x(Ni_{1/3}Nb_{2/3})_yO_3$ (x/y=0.96–1.06), a ceramic component comprising $Sr_x(Ni_{1/3}Nb_{2/3})_yO_3$ (x/y=0.96–1.06) as the main constituent and one or more minor constituents which are selected from the group consisting of $TiO_2$, $SrTiO_3$ and $CaTiO_3$ ($TiO_2 \leq 25\%$ by mole, $SrTiO_3 \leq 6.5\%$ by mole, and $CaTiO_3 \leq 13.3\%$ by mole), or a ceramic component comprising $Sr_x(Ni_{1/3}Nb_{2/3})_yO_3$ (x/y=0.96–1.06) and $Ba(M''_{1/3}M'_{2/3})O_3$ (M'' is Ni, Mg or Zn, and M' is Nb or Ta, provided that M''=Ni, Mg or Zn when M'=Nb, and M''=Mg or Zn when M'=Ta), and 0.1–50% by weight of glass added to the ceramic component.

18 Claims, No Drawings

DIELECTRIC COMPOSITION FOR HIGH FREQUENCIES

FIELD OF THE INVENTION

The present invention relates to a dielectric composition for high frequencies which is useful to provide dielectrics for constructing elements which are used in high-frequency circuits.

DESCRIPTION OF THE RELATED ART

The use of multi-layer devices is effective in downsizing and increasing the reliability of parts such as filters which are used in high-frequency circuits. The materials used for preparing multi-layer devices for such applications are required to have reasonable relative permittivities and high Q (in other words, less dielectric loss), and to be capable of being fired at 1,000° C. or below, more specifically, of being satisfactorily densified by firing at 1,000° C. or below, since they must be fired together with Cu and/or an Ag/Pd conductor.

Dielectrics hitherto developed and used for high frequencies which can be fired at 1,000° C. or below include 1) $BaO-Al_2O_3-B_2O_3-SiO_2$-or $BaO-SrO-ZrO_2-SiO_2$—based glass materials;

2) Pb-containing perovskite-based materials;

3) Bi-containing materials; and

4) Ceramic-glass composite materials.

The conventional materials mentioned above have the following problems. Specifically, use of the Pb-containing perovskite-based or Bi-containing materials results in variation in composition due to evaporation of the components during firing, and this prevents the manufacture of products having a uniform composition. On the other hand, the $BaO-Al_2O_3-B_2O_3-SiO_2$-or $BaO-SrO-ZrO_2-SiO_2$—based glass materials, and the ceramic-glass composite materials have relative permittivities as low as $\epsilon=6$, and $\epsilon=14$, respectively, and further their values of Q are as relatively small as approximately 1,000 (1 MHz).

Here, dielectric compositions for high frequencies which are used in dielectric resonators and so on must have temperature coefficients $\tau_f$ of resonance frequencies which are close to 0 ppm/°C., whereas dielectric compositions for high frequencies which are used as capacitor materials must have temperature coefficients $\tau\epsilon$ of relative permittivities which roughly satisfy the relationship: $-60$ ppm/°C. $\leq \tau\epsilon \leq 60$ ppm/°C. (CH properties).

OBJECT AND SUMMARY OF THE INVENTION

It is an object of the present invention to provide a dielectric composition for high frequencies, free of the problems of the prior art mentioned above, which is useful as a material for preparing multi-layer devices which are effective in downsizing and increasing the reliability of elements for use in high-frequency circuits, both the relative permittivity and the Q of which are high, and which can be fired at 1,000° C. or below.

It is another object of the present invention to provide a high-performance dielectric composition for high frequencies, both the relative permittivity and the Q of which are high, which can be fired at 1,000° C. or below, and which has a small absolute value of the temperature coefficient $\tau f$ of the resonance frequency and the temperature coefficient $\tau\epsilon$ of the relative permittivity.

The dielectric composition for high frequencies according to a first embodiment of the present invention is characterized by the addition of 0.1–50% by weight of glass to a ceramic component comprising $Sr_x(Ni_{1/3}Nb_{2/3})_yO_3$ (wherein x/y=0.96–1.06).

The addition of 0.1–50% by weight of glass to the $Sr_x(Ni_{1/3}Nb_{2/3})_yO_3$ allows firing at 1,000° C. or below without decreasing the Q and the $\epsilon$.

The dielectric composition for high frequencies according to a second embodiment of the present invention is characterized by the addition of 0.1–50% by weight of glass to a ceramic component comprising $Sr_x(Ni_{1/3}Nb_{2/3})_yO_3$ (wherein x/y=0.96–1.06) as the main constituent and one or more minor constituents which are selected from the group consisting of $TiO_2$, $SrTiO_3$ and $CaTiO_3$, wherein $TiO_2$ comprises 25% by mole or less, $SrTiO_3$ comprises 6.5% by mole or less, and $CaTiO_3$ comprises 13.3% by mole or less of the ceramic component.

According to the second embodiment, addition of a predetermined proportion of one or more materials which are selected from the group consisting of $TiO_2$, $SrTiO_3$ and $CaTiO_3$ to a $Sr_x(Ni_{1/3}Nb_{2/3})_yO_3$ ceramic-glass composite material, particularly a $Sr_x(Ni_{1/3}Nb_{2/3})_yO_3$ ceramic-($MgO-BaO-B_2O_3-SiO_2$) glass composite material, provides a dielectric composition which has desired values of $\tau_f$ and $\tau\epsilon$ within the range: $-40$ ppm/°C. $\leq \tau_f \leq 20$ ppm/°C. ($-60$ ppm/°C. $\leq \tau\epsilon \leq 60$ ppm/°C.), while satisfying the following equation:

$$\tau_f = -\tau\epsilon/2 - \alpha \;(\alpha\text{:coefficient of linear expansion of the material}=10 \text{ ppm/°C.)}$$

The dielectric composition for high frequencies according to a third embodiment of the present invention is characterized by the addition of 0.1–50% by weight of glass to a ceramic component comprising $Sr_x(Ni_{1/3}Nb_{2/3})_yO_3$ (wherein x/y=0.96–1.06) and $Ba(M''_{1/3}M^V_{2/3})O_3$ (wherein $M''$ is Ni, Mg or Zn, and $M^V$ is Nb or Ta, provided that $M''$ is Ni, Mg or Zn when $M^V$ is Nb, and $M''$ is Mg or Zn when $M^V$ is Ta).

It is possible to solve the problems of the $Sr_x(Ni_{1/3}Nb_{2/3})_yO_3$ ceramic-($MgO-BaO-B_2O_3-SiO_2$) glass composite material and thus to provide a high-performance dielectric composition for high frequencies which has a temperature coefficient $\tau_f$ of the resonance frequency which is close to 0 ppm/°C., and a temperature coefficient $\tau\epsilon$ of the relative permittivity which satisfies the relationship: $-60$ ppm/°C. $\leq \tau\epsilon \leq 60$ ppm/°C., by further compounding the $Sr_x(Ni_{1/3}Nb_{2/3})_yO_3$ ceramic-glass composite material, particularly the $Sr_x(Ni_{1/3}Nb_{2/3})_yO_3$ ceramic-($MgO-BaO-B_2O_3-SiO_2$) glass composite material, with the $Ba(M''_{1/3}M^V_{2/3})O_3$ (wherein $M''$ is Ni, Mg or Zn, and $M^V$ is Nb or Ta, provided that $M''$ is Ni, Mg or Zn when $M^V$ is Nb, and $M''$ is Mg or Zn when $M^V$ is Ta).

DESCRIPTION OF THE PREFERRED EMBODIMENTS

The present invention will now be described in detail.

The dielectric composition for high frequencies according to the present invention is prepared by adding 0.1–50% by weight of glass to a specific ceramic component.

Therefore, an explanation will be first given regarding the ceramic component of a ceramic-glass composite-base dielectric composition for high frequencies according to the present invention.

The ceramic component of the dielectric composition for high frequencies according to the first embodiment is $Sr_x(Ni_{1/3}Nb_{2/3})_yO_3$ (wherein x/y=0.96–1.06).

According to the present invention, when the dielectric composition is fired in an atmosphere of nitrogen, the x/y ratio of the ceramic component $Sr_x(Ni_{1/3}Nb_{2/3})_yO_3$ is preferred to be 0.96–1.06. The Q of the resulting dielectric remarkably decreases when the value is lower than 0.96 or exceeds 1.06.

In contrast, when the dielectric composition is fired in the air, the x/y ratio of the ceramic component $Sr_x(Ni_{1/3}Nb_{2/3})_yO_3$ is preferred to be 0.96–1.01. The Q of the resulting dielectric remarkably decreases when the alue is lower than 0.96 or exceeds 1.01.

The ceramic component according to the second embodiment comprises a main constituent represented by $Sr_x(Ni_{1/3}Nb_{2/3})_yO_3$ (wherein x/y=0.96–1.06), and one or more minor constituents which are selected from the group consisting of $TiO_2$, $SrTiO_3$ and $CaTiO_3$, wherein $TiO_2 \leq 25\%$ by mole $SrTiO_3 \leq 6.5\%$ by mole, and $CaTiO_3 \leq 13.3\%$ by mole According to the second embodiment, the proportions of the minor constituents of the ceramic component which exceed the ranges mentioned above lead to the excessive presence of the minor constituents, and this undesirably results in $\tau_f > 20$ and $\tau_\epsilon < -60$.

The proportions of the minor constituents of the ceramic component are preferred to be 20% by mole or less in total.

The ceramic component according to the third embodiment comprises $Sr_x(Ni_{1/3}Nb_{2/3})_yO_3$ (wherein x/y= 0.96–1.06) and $Ba(M^{II}_{1/3}M^{V}_{2/3})O_3$ (wherein $M^{II}$ is Ni, Mg or Zn, and $M^V$ is Nb or Ta, provided that $M^{II}$ is Ni, Mg or Zn when $M^V$ is Nb, and $M^{II}$ is Mg or Zn when $M^V$ is Ta).

According to the third embodiment, the $Sr_x(Ni_{1/3}Nb_{2/3})_yO_3$ and the $Ba(M^{II}_{1/3}M^{V}_{2/3})O_3$ which constitute the ceramic component are preferably compounded at the molar ratio of $Sr_x(Ni_{1/3}Nb_{2/3})_yO_3 : Ba(M^{II}_{1/3}M^{V}_{2/3})O_3 = (1-\alpha):\alpha$ (wherein $0 < \alpha \leq 0.8$), that is, so as to provide a ceramic composition represented by $(1-\alpha) Sr_x(Ni_{1/3}Nb_{2/3})_yO_3 \cdot \alpha Ba(M^{II}_{1/3}M^{V}_{2/3})O_3$ ($0 < \alpha \leq 0.8$). Here, when the value of $\alpha$ exceeds 0.8, the proportion of the $Ba(M^{II}_{1/3}M^{V}_{2/3})O_3$ increases excessively and impairs the effects of the present invention which result from the further compounding of the $Sr_x(Ni_{1/3}Nb_{2/3})_yO_3$—glass composite material with the $Ba(M^{II}_{1/3}M^{V}_{2/3})O_3$, thus failing to give preferable values of $\tau_f$ and $\tau_\epsilon$. The preferable values of $\alpha$ are as follows depending on the relationship with the $Ba(M^{II}_{1/3}M^{V}_{2/3})O_3$.

In cases where the $Ba(M^{II}_{1/3}M^{V}_{2/3})O_3$ is $Ba(Ni_{1/3}Nb_{2/3})O_3$: $0 < \alpha \leq 0.8$, in cases where the $Ba(M^{II}_{1/3}M^{V}_{2/3})O_3$ is $Ba(Mg_{1/3}Nb_{2/3})O_3$: $0 < \alpha \leq 0.34$, In cases where the $Ba(M^{II}_{1/3}M^{V}_{2/3})O_3$ is $Ba(Zn_{1/3}Nb_{2/3})O_3$: $0 < \alpha \leq 0.33$, in cases where the $Ba(M^{II}_{1/3}M^{V}_{2/3})O_3$ is $Ba(Mg_{1/3}Ta_{2/3})O_3$: $0 < \alpha \leq 0.73$, and in cases where the $Ba(M^{II}_{1/3}M^{V}_{2/3})O_3$ is $Ba(Zn_{1/3}Ta_{2/3})O_3$: $0 < \alpha \leq 0.76$.

According to the first through the third embodiments, the addition of glass to the ceramic coponent descried above in a proportion less than 0.1% by weight fails to achieve satisfactory densification by firing at 1,000° C. or below, and thus results in a lower Q. The addition of more than 50% by weight of glass to the ceramic component results in a relatively lower content of the ceramic component, and this results in a decrease in the dielectric coefficient and the Q.

When glass is added to the ceramic component in a proportion of 1–40% by weight, particularly 2–30% by weight, according to the present invention, a dielectric composition for high frequencies is provided with significantly increased dielectric coefficient and Q, and also with excellent $\tau_f$ and $\tau_\epsilon$ according to the second and the third embodiments thereof.

Here, according to the present invention, the glass preferably is $MgO$-$BaO$-$B_2O_3$-$SiO_2$—based glass, and the preferable composition thereof is as follows.

| Composition of MgO—BaO—$B_2O_3$—$SiO_2$-based glass (weight %) | |
| --- | --- |
| MgO | 20–50 |
| BaO | 5–25 |
| $B_2O_3$ | 15–30 |
| $SiO_2$ | 10–25 |

The dielectric composition for high frequencies according to the first embodiment can be easily prepared by mixing a ceramic component $Sr_x(Ni_{1/3}Nb_{2/3})_yO_3$ which is prepared by mixing and calcinating oxides or carbonates of the metal elements which constitute the $Sr_x(Ni_{1/3}Nb_{2/3})_yO_3$, for example, $SrCO_3$, NiO and $Nb_2O_5$, in the proportions so as to provide the composition of the $Sr_x(Ni_{1/3}Nb_{2/3})_yO_3$, with a predetermined proportion of glass added thereto, and such dielectric composition for high frequencies according to the present invention can be easily put into practical use by being formed with an appropriate binder added, and being fired in an atmosphere of nitrogen or in the air at 1,000° C. or below, for example, 950°–980° C. Here, the binder is removed in the air at 500°–600° C. prior to firing in cases where the firing is carried out in an atmosphere of nitrogen.

The dielectric composition for high frequencies according to the second embodiment can be easily prepared by mixing the main constituent $Sr_x(Ni_{1/3}Nb_{2/3})_yO_3$ which is obtained by mixing and calcinating oxides or carbonates of the metal elements which constitute the $Sr_x(Ni_{1/3}Nb_{2/3})_yO_3$, for example, $SrCO_3$, NiO and $Nb_2O_5$, in the proportions so as to provide the composition of the $Sr_x(Ni_{1/3}Nb_{2/3})_yO_3$, with the minor constituent $TiO_2$ or the minor constituent $SrTiO_3$ or $CaTiO_3$ which is obtained as described below, and further with a predetermined proportion of glass added thereto. The minor constituent $SrTiO_3$ is obtained by mixing and calcinating, for example, $SrCO_3$ and $TiO_2$, so as to provide the composition of $SrTiO_3$. The minor constituent $CaTiO_3$ is obtained by mixing and calcinating, for example, $CaCO_3$ and $TiO_2$, so as to provide the composition of $CaTiO_3$. Such dielectric compositions for high frequencies according to the present invention can be easily put into practical use by being formed with an appropriate binder added thereto, and fired at 1,000° C. or below, for example, 950°–980° C.

The dielectric composition for high frequencies according to the third embodiment can be easily prepared by measuring out the $Sr_x(Ni_{1/3}Nb_{2/3})_yO_3$ and the $Ba(M^{II}_{1/3}M^{V}_{2/3})O_3$ so as to provide a predetermined molar ratio, which are obtained by mixing and calcinating oxides or carbonates of the metal elements which constitute the $Sr_x(Ni_{1/3}Nb_{2/3})_yO_3$ and the $Ba(M^{II}_{1/3}M^{V}_{2/3})O_3$, for example, $SrCO_3$, $BaCO_3$, NiO, $Nb_2O_5$, MgO, ZnO and $Ta_2O_5$, in the proportions so as to provide the compositions of the $Sr_x(Ni_{1/3}Nb_{2/3})_yO_3$ and the $Ba(M^{II}_{1/3}M^{V}_{2/3})O_3$, respectively, and mixing the $Sr_x(Ni_{1/3}Nb_{2/3})_yO_3$ and $Ba(M^{II}_{1/3}M^{V}_{2/3})O_3$ with a predetermined proportion of glass added thereto. Such a dielectric composition for high frequencies according to the present invention can be easily put into practical use by being formed with an appropriate binder added thereto, and fired at 1,000° C. or below, for exile, 950°–980° C.

Here, in cases where glass, for exile, $MgO$-$BaO$-$B_2O_3$-$SiO_2$—based glass, is added, the glass is desired to be added as a glass frit prepared in advance, though the respective oxides in the same weight proportions as the glass component or substantial amounts of the carbonates can be added to andmixed with the ceramic component to concurrently achieve the vitrification and calcination during the process of heat treatment.

The present invention will now be explained more specifically with reference to the Examples.

EXAMPLES 1–9, and Comparative Examples 1 and 2

$SrCO_3$, NiO and $Nb_2O_5$ were measured out in the stoichiometric proportions so as to provide $Sr_x(Ni_{1/3}Nb_{2/3})_yO_3$ (x/y=1), and crushed and mixed with 2-propanol as the dispersing medium in a ball mill for 24 hours, and the mixture was dried and then calcined in the air at 1,350° C. for 4 hours. The calcination product was again crushed and mixed with 2-propanol as the dispersing medium in the ball mill for 24 hours to synthesize $Sr(Ni_{1/3}Nb_{2/3})O_3$.

The resulting $Sr(Ni_{1/3}Nb_{2/3})O_3$ was mixed with a MgO-BaO-$B_2O_3$-$SiO_2$-based glass (weight ratio of the constituents, MgO: BaO: $B_2O_3$: $SiO_2$=45: 15: 25: 15) frit added thereto in the proportions indicated in. Table 1, and 25% by weight of a binder (5% by weight of an aqueous solution of polyvinyl alcohol) was added to each mixture to form a 15-mm-dia, 1.5-mm-thick pellet which was fired in the air at 980° C. for 1 hour.

The relative permittivities $\epsilon$, Q and relative densities of the resulting specimens were measured, with the results shown in Table 1.

Here, the relative permittivities were measured at a frequency of 1 MHz, a voltage of 0.5 Vrms, and a temperature of 25° C., with an LF impedance analyzer model 4192A manufactured by YHP, Inc. The values of Q were measured at a frequency of 1 MHz, and a temperature of 25° C., with a Q meter model 4342A manufactured by YHP, Inc.

TABLE 1

| Specimen | | Amount of glass added (wt. %) | Relative permittivity ($\epsilon$) | Q | Relative density (%) |
|---|---|---|---|---|---|
| Comp. Ex. | 1 | 0.05 | 14.5 | 950 | 80 |
| Example | 1 | 0.1 | 22.1 | 1,800 | 90 |
| | 2 | 1 | 28.5 | 2,100 | 92 |
| | 3 | 2 | 29.2 | 2,400 | 95 |
| | 4 | 3 | 29.0 | 2,500 | 96 |
| | 5 | 10 | 25.3 | 2,500 | 96 |
| | 6 | 20 | 22.0 | 2,600 | 97 |
| | 7 | 30 | 18.5 | 2,500 | 97 |
| | 8 | 40 | 17.0 | 2,000 | 97 |
| | 9 | 50 | 15.0 | 1,500 | 97 |
| Comp. Ex. | 2 | 55 | 12.2 | 850 | 97 |

Table 1 clearly shows the following facts.

Specifically, when the amount of glass added is less than 0.1% by weight (Comparative Example 1), the composition is not satisfactorily densified at the firing temperature of 980° C., and a satisfactory value of Q is not achieved. On the other hand, when the amount of glass added exceeds 50% by weight (Comparative Example 2), satisfactory values of Q and $\epsilon$ are not achieved due to the lower proportion of $Sr(Ni_{1/3}Nb_{2/3})O_3$.

In contrast, when glass is added at a rate of 0.1–50% by weight (Examples 1–9), particularly 1–40% by weight (Examples 2–8), and more particularly 2–30% by weight (Examples 3–7), satisfactory degrees of density are achieved by firing at 980° C., with higher levels of both Q and $\epsilon$.

EXAMPLES 10–13, and Comparative Examples 3–5

Pellets were formed and fired in the air at 980° C. in the same manner as in Example 5, except that the $Sr_x(Ni_{1/3}Nb_{2/3})_yO_3$ was synthesized so as to have the x/y values indicated in Table 2 and the binder was added at a rate of 20% by weight.

The relative permittivities $\epsilon$ and the values of Q of the resulting specimens were measured in the same manner as in Example 1, and the temperature coefficients τε of the relative permittivities thereof were concurrently investigated, with the results shown in Table 2.

Here, the temperature coefficients τε of the relative permittivities were calculated from the capacitances $C_{20}$ and $C_{85}$ measured at 20° C. and 85° C., respectively, according to the following equation:

$$(C_{85} - C_{20})/C_{20}(85-20) \times 10^6 \text{ (ppm/°C.)}$$

TABLE 2

| Specimen | | x/y | Relative permittivity ($\epsilon$) | Q | Temp. coef. τε of relative permittivity (ppm/°C.) | Remarks |
|---|---|---|---|---|---|---|
| Comp. Ex. | 3 | 0.94 | 25.2 | 1,400 | 60 | Q decreased |
| Example | 10 | 0.96 | 25.0 | 2,300 | 60 | |
| | 11 | 0.98 | 25.1 | 3,000 | 60 | |
| | 12 | 1.00 | 25.3 | 2,500 | 60 | |
| | 13 | 1.01 | 25.2 | 2,000 | 60 | |
| Comp. Ex. | 4 | 1.02 | 25.3 | 300 | 140 | Q decreased, and temp. coef. increased |
| | 5 | 1.04 | 25.4 | 250 | 200 | Q decreased, and temp. coef. increased |

As clearly shown in Table 2, x/y must be 0.96–1.01 when the firing is accomplished in the air.

EXAMPLES 14–19, and Comparative Example 6, 13

Pellets were formed in the same manner as in Example 5, except that the $Sr_x(Ni_{1/3}Nb_{2/3})_yO_3$ was synthesized so as to have the x/y values indicated in Table 3 and the binder was added at a rate of 20% by weight. The obtained pellets were treated to remove the binder in the air at 600° C. for 4 hours, and then fired in an atmosphere of nitrogen at 980° C. for 1 hour.

The relative permittivities $\epsilon$, the values of Q, and the temperature coefficients τε of the relative permittivities of the resulting specimens were measured in the same manner as in Example 10, with the results shown in Table 3.

TABLE 3

| Specimen | | x/y | Relative permittivity ($\epsilon$) | Q | Temp. coef. τε of relative permittivity (ppm/°C.) | Remarks |
|---|---|---|---|---|---|---|
| Example | 14 | 0.96 | 25.0 | 3,500 | 60 | |
| | 15 | 0.98 | 25.1 | 4,100 | 60 | |
| | 16 | 1.00 | 25.0 | 4,200 | 60 | |

TABLE 3-continued

| Specimen | | x/y | Relative permittivity (ε) | Q | Temp. coef. τε of relative permittivity (ppm/°C) | Remarks |
|---|---|---|---|---|---|---|
| | 17 | 1.02 | 25.0 | 4,200 | 60 | |
| | 18 | 1.04 | 24.9 | 3,900 | 60 | |
| | 19 | 1.06 | 24.9 | 3,000 | 60 | |
| Comp. Ex. | 6 | 1.08 | 24.9 | 1,900 | 80 | Temp. coef. increased |
| | 13 | 0.94 | 24.8 | 1,300 | 60 | Q decreased |

As is apparent from Table 3, x/y must be 0.96–1.06 when the firing is accomplished in an atmosphere of nitrogen.

The results described above show that the dielectric composition for high frequencies according to the first embodiment of the present invention has high values of both Q and ε, and can be fired at 1,000° C. or below. Therefore, according to the first embodiment of the present invention, downsizing of and increasing the reliability of elements for use in high-frequency circuits can be effectively achieved by constructing high-performance multi-layer devices.

EXAMPLES 20–30, and Comparative Examples 7–9

$SrCO_3$, NiO and $Nb_2O_5$ were measured out in the stoichiometric proportions so as to provide $Sr_x(Ni_{1/3}Nb_{2/3})_yO_3$ (x/y=1), and crushed and mixed with 2-propanol as the dispersing medium in a ball mill for 24 hours, then the mixture was dried and calcined in the air at 1,350° C. for 4 hours. The calcination product was again crushed and mixed with 2-propanol as the dispersing medium in the ball mill for 24 hours to synthesize $Sr(Ni_{1/3}Nb_{2/3})O_3$.

The resulting $Sr(Ni_{1/3}Nb_{2/3})O_3$ and $TiO_2$, $SrTiO_3$ or $CaTiO_3$, wherein $SrTiO_3$ and $CaTiO_3$ were obtained by crushing, mixing, drying, calcinating, crushing and mixing processes using $TiO_2$ or $SrCO_3$ or $CaCO_3$, and $TiO_2$ as the raw materials in the same manner as the above synthesis of $Sr(Ni_{1/3}Nb_{2/3})O_3$, were measured out in the proportions indicated in Table 4, a $MgO$-$BaO$-$B_2O_3$-$SiO_2$-based glass (weight ratio of the constituents, MgO: BaO: $B_2O_3$: $SiO_2$= 45: 15: 25: 15) frit was added to the resulting ceramic component at a rate of 10% by weight, and 20% by weight of a binder (5% by weight of an aqueous solution of polyvinyl alcohol) was added to the mixture to form a 15-mm-dia, 1.5-mm-thick pellet which was fired in the air at 980° C. for 1 hour.

The temperature coefficients $\tau_f$ of the resonance frequencies and the temperature coefficients τε of the relative permittivities of the resulting specimens were measured, with the results shown in Table 4.

TABLE 4

| Specimen | | Constituents of dielectric composition (moles %) | | | | $\tau_f$ (ppm/°C) | $\tau_\epsilon$ (ppm/°C) | relative permittivity (ε) | Q |
|---|---|---|---|---|---|---|---|---|---|
| | | Main constituent | Minor constituents | | | | | | |
| | | $Sr(Ni_{1/3}Nb_{2/3})O_3$ | $TiO_2$ | $SrTiO_3$ | $CaTiO_3$ | | | | |
| Example | 20 | 91.7 | 8.3 | | | −20 | 20 | 28.4 | 2,200 |
| | 21 | 83.4 | 16.0 | | | 0 | −20 | 31.9 | 2,100 |
| | 22 | 75.0 | 25.0 | | | 20 | −60 | 36.0 | 1,800 |
| Comp. Ex. | 7 | 70.9 | 29.1 | | | 30 | −80 | 38.1 | 1,600 |
| Example | 23 | 97.8 | | 2.2 | | −20 | 20 | 26.6 | 2,300 |
| | 24 | 95.7 | | 4.3 | | 0 | −20 | 27.9 | 2,100 |
| | 25 | 93.5 | | 6.5 | | 20 | −60 | 29.4 | 2,000 |
| Comp. Ex. | 8 | 92.4 | | 7.6 | | 30 | −80 | 30.1 | 1,500 |
| Example | 26 | 95.6 | | | 4.4 | −20 | 20 | 27.5 | 2,300 |
| | 27 | 91.1 | | | 8.9 | 0 | −20 | 29.9 | 2,100 |
| | 28 | 86.7 | | | 13.3 | 20 | −60 | 32.5 | 2,000 |
| Comp. Ex. | 9 | 84.5 | | | 15.5 | 30 | −80 | 33.9 | 1,700 |
| Example | 29 | 89.27 | 8.05 | 1.79 | 0.89 | 0 | −20 | 28.7 | 2,100 |
| | 30 | 86.61 | 11.65 | 0.87 | 0.87 | 0 | −20 | 29.5 | 2,000 |

The results described above clearly show that the dielectric composition for high frequencies according to the second embodiment of the present invention is a high-performance dielectric composition for high frequencies which has high values of both Q and ε, can be fired at 1,000° C. or below, and has preferable values of both the temperature coefficient $\tau_f$ of the resonance frequency and the temperature coefficient τε of the relative permittivity. Therefore, according to the second embodiment of the present invention, downsizing of and increasing the reliability of elements which are used in high-frequency circuits can be effectively achieved by constructing dielectric resonators or high-performance multi-layer devices as materials for preparing temperature-compensating capacitors.

EXAMPLES 31–60, and Comparative Example 10

$SrCO_3$, $BaCO_3$, NiO, $Nb_2O_5$, MgO, ZnO and $Ta_2O_5$ were measured out in the stoichiometric proportions so as to provide $Sr_x(Ni_{1/3}Nb_{2/3})_yO_3$ (x/y=1) and Ba $(M''_{1/3}M'_{2/3})O_3$ (wherein $M''$ is Ni, Mg or Zn, and M'is Nb or Ta) indicated in Table 5, respectively, and crushed andmixed with 2-propanol as the dispersing medium in a ball mill for 24 hours, and the mixtures were dried and then calcined in the air at 1,400° C. for 4 hours. The calcination products were again crushed and mixed with 2-propanol as the dispersing medium in the ball mill for 24 hours to synthesize. $Sr(Ni_{1/3}Nb_{2/3})O_3$ and $Ba(M^{II}_{1/3}M^{V}_{2/3})O_3$, respectively.

The resulting $Sr(Ni_{1/3}Nb_{2/3})O_3$ and $Ba(M^{II}_{1/3}M^{V}_{2/3})O_3$ were measured out so as to provide the compositions of the ceramic component indicated in Table 5, and each was mixed with a $MgO-BaO-B_2O_3SiO_2$-based glass (weight ratio of the constituents, $MgO: BaO: B_2O_3: SiO_2=45: 15: 25: 15$) frit added thereto at a rate of 10% by weight, and 20% by weight of a binder (5% by weight of an aqueous solution of polyvinyl alcohol) was added to each mixture to form a 15-mm-dia, 1.5-mm-thick pellet which was fired in the air at 980° C. for 1 hour.

The temperature coefficients $\tau_f$ of the resonance frequencies and the temperature coefficients $\tau\epsilon$ of the relative permittivities of the resulting specimens were measured, with the results shown in Table 5.

Table 5 clearly shows that the incorporation of the $Ba(M^{II}_{1/3}M^{V}_{2/3})O_3$ improves the temperature coefficients $\tau_f$ of the resonance frequencies and the temperature coefficients $\tau\epsilon$ of the relative permittivities.

relative permittivities e and the values of Q were measured at 1 MHz.

TABLE 6

| Specimen | Amount of glass added (wt. %) | Relative density (%) | Relative permittivity ($\epsilon$) | Q |
|---|---|---|---|---|
| Comp. Ex. 11 | 0.05 | 80 | 10.8 | 750 |
| Example 61 | 0.1 | 90 | 18.2 | 1,600 |
| 62 | 1 | 92 | 23.3 | 1,900 |
| 63 | 40 | 97 | 13.3 | 1,800 |
| Comp. Ex. 12 | 55 | 97 | 9.7 | 700 |

Table 6 clearly shows that the addition of glass to the ceramic component at a rate of 0.1–50% by weight, particularly 1–40% by weight, improves the properties.

The results described above clearly show that the dielectric composition for high frequencies according to the third embodiment of the present invention is a high-performance dielectric composition for high frequencies which has high values of both Q and $\epsilon$, can be fired at 1,000° C. or below, and further has a temperature coefficient $\tau_f$ of the resonance frequency which is close to 0 ppm/°C., and a temperature

TABLE 5

| Specimen | Composition of ceramic component $(1-\alpha)Sr(Ni_{1/3}Nb_{2/3})O_3 - \alpha Ba(M^{II}_{1/3}M^{V}_{2/3})O_3$ | | $\tau\epsilon$ (ppm/°C.) | $\tau_f$ (ppm/°C.) |
|---|---|---|---|---|
| | Type of $Ba(M^{II}_{1/3}M^{V}_{2/3})O_3$ | Value of $\alpha$ | | |
| Example 31 | $Ba(Ni_{1/3}Nb_{2/3})O_3$ | 0.05 | 10 | −15 |
| 32 | | 0.1 | −4 | −8 |
| 33 | | 0.2 | −20 | 0 |
| 34 | | 0.3 | −30 | 5 |
| 35 | | 0.5 | −42 | 11 |
| 36 | | 0.8 | −60 | 20 |
| Comp. Ex. 10 | | 1 | −68 | 24 |
| Example 37 | $Ba(Mg_{1/3}Nb_{2/3})O_3$ | 0.02 | 24 | −22 |
| 38 | | 0.05 | −6 | −7 |
| 39 | | 0.1 | −26 | 3 |
| 40 | | 0.2 | −48 | 14 |
| 41 | | 0.3 | −56 | 18 |
| 42 | | 0.34 | −60 | 20 |
| 43 | $Ba(Zn_{1/3}Nb_{2/3})O_3$ | 0.02 | 26 | −23 |
| 44 | | 0.05 | 2 | −11 |
| 45 | | 0.1 | −26 | 3 |
| 46 | | 0.2 | −46 | 13 |
| 47 | | 0.3 | −54 | 17 |
| 48 | | 0.33 | −60 | 20 |
| 49 | $Ba(Mg_{1/3}Ta_{2/3})O_3$ | 0.05 | 24 | −22 |
| 50 | | 0.1 | −2 | −9 |
| 51 | | 0.2 | −32 | 6 |
| 52 | | 0.3 | −46 | 13 |
| 53 | | 0.7 | −58 | 19 |
| 54 | | 0.73 | −60 | 20 |
| 55 | $Ba(Zn_{1/3}Ta_{2/3})O_3$ | 0.05 | 10 | −15 |
| 56 | | 0.1 | −4 | −8 |
| 57 | | 0.2 | −28 | 4 |
| 58 | | 0.4 | −44 | 12 |
| 59 | | 0.7 | −58 | 19 |
| 60 | | 0.76 | −60 | 20 |

EXAMPLES 61–63, and Comparative Examples 11 and 12

Specimens were prepared in the same manner as in Example 33, except that glass was added to $0.8Sr(Ni_{1/3}Nb_{2/3})O_3 \cdot 0.2Ba(Ni_{1/3}Nb_{2/3})O_3$ at rates indicated in Table 6, and various properties of the respective specimens were investigated, with the results shown in Table 6. Here, the coefficient $\tau\epsilon$ of the relative permittivity which satisfies the relationship: $-60 \text{ ppm/°C.} \leq \tau\epsilon \leq 60 \text{ ppm/°C.}$ Therefore, according to the third embodiment of the present invention, downsizing of and increasing the reliability of elements which are used in high-frequency circuits can be effectively achieved by constructing dielectric resonators or high-performance multi-layer devices as materials for preparing capacitors.

What is claimed is:

1. A dielectric composition for high frequencies, which comprises a ceramic component comprising $Sr_x(Ni_{1/3}Nb_{2/3})_yO_3$ (wherein x/y=0.96–1.06), and 0.1–50% by weight of glass added thereto.

2. A dielectric composition for high frequencies as claimed in claim 1, which is fired in an atmosphere of nitrogen.

3. A dielectric composition for high frequencies as claimed in claim 1, which is fired in the air, and the x/y ratio of the ceramic component of which is 0.96–1.01.

4. A dielectric composition for high frequencies as claimed in claim 1, wherein said glass consists mainly of $MgO\text{-}BaO\text{-}B_2O_3\text{-}SiO_2$, and said glass is added to said ceramic component at a rate of 1–40% by weight.

5. A dielectric composition for high frequencies as claimed in claim 4, wherein said glass is $MgO\text{-}BaO\text{-}B_2O_3\text{-}SiO_2$—based glass which contains 20–50% by weight of MgO, 5–25% by weight of BaO, 15–30% by weight of $B_2O_3$, and 10–25% by weight of $SiO_2$, and said glass is added to said ceramic component at a rate of 2–30% by weight.

6. A dielectric composition for high frequencies, which comprises a ceramic component comprising $Sr_x(Ni_{1/3}Nb_{2/3})_yO_3$ (wherein x/y=0.96–1.06) as the main constituent, and one or more minor constituents which are selected from the group consisting of $TiO_2$, $SrTiO_3$ and $CaTiO_3$, wherein $TiO_2$ comprises 25% by mole or less, $SrTiO_3$ comprises 6.5% by mole or less, and $CaTiO_3$ comprises 13.3% by mole or less of said ceramic component, and 0.1–50% by weight of glass added to said ceramic component.

7. A dielectric composition for high frequencies as claimed in claim 6, wherein said glass consists mainly of $MgO\text{-}BaO\text{-}B_2O_3\text{-}SiO_2$, and said glass is added to said ceramic component at a rate of 1–40% by weight.

8. A dielectric composition for high frequencies as claimed in claim 6, wherein the proportions of the minor constituents of the ceramic component which are selected from the group consisting of $TiO_2$, $SrTiO_3$ and $CaTiO_3$ totals 20% by mole or less.

9. A dielectric composition for high frequencies as claimed in claim 7, wherein said glass is $MgO\text{-}BaO\text{-}B_2O_3\text{-}SiO_2$—based glass which contains 20–50% by weight of MgO, 5–25% by weight of BaO, 15–30% by weight of $B_2O_3$, and 10–25% by weight of $SiO_2$, and said glass is added to said ceramic component at a rate of 2–30% by weight.

10. A dielectric composition for high frequencies, which comprises a ceramic component comprising $Sr_x(Ni_{1/3}Nb_{2/3})_yO_3$ (wherein x/y=0.96–1.06) and $Ba(M^{II}_{1/3}M^V_{2/3})O_3$ (wherein $M^{II}$ is Ni, Mg or Zn, and $M^V$ is Nb or Ta, provided that $M^{II}$ is Ni, Mg or Zn when $M^V$ is Nb, and $M^{II}$ is Mg or Zn when $M^V$ is Ta), and 0.1–50% by weight of glass added to said ceramic component.

11. A dielectric composition for high frequencies as claimed in claim 10, wherein the composition of said ceramic component is represented by $(1-\alpha)Sr_x(Ni_{1/3}Nb_{2/3})_yO_3 \cdot Ba(M^{II}_{1/3}M^V_{2/3})O_3$ (wherein $M^{II}$ is Ni, Mg or Zn, and $M^V$ is Nb or Ta, provided that $M^{II}$ is Ni, Mg or Zn when $M^V$ is Nb, and $M^{II}$ is Mg or Zn when $M^V$ is Ta), and $\alpha$ satisfies $0<\alpha\leq 0.8$.

12. A dielectric composition for high frequencies as claimed in claim 10 wherein said glass consists mainly of $MgO\text{-}BaO\text{-}B_2O_3\text{-}SiO_2$, and said glass is added to said ceramic component at a rate of 1–40% by weight.

13. A dielectric composition for high frequencies as claimed in claim 11, wherein said $Ba(M^{II}_{1/3}M^V_{2/3})O_3$ is $Ba(Ni_{1/3}Nb_{2/3})O_3$, and $0<\alpha<0.8$.

14. A dielectric composition for high frequencies as claimed in claim 11, wherein said $Ba(M^{II}_{1/3}M^V_{2/3})O_3$ is $Ba(Mg_{1/3}Nb_{2/3})O_3$, and $0<\alpha\leq 0.34$.

15. A dielectric composition for high frequencies as claimed in claim 11, wherein said $Ba(M^{II}_{1/3}M^V_{2/3})O_3$ is $Ba(Zn_{1/3}Nb_{2/3})O_3$, and $0<\alpha\leq 0.33$.

16. A dielectric composition for high frequencies as claimed in claim 11, wherein said $Ba(M^{II}_{1/3}M^V_{2/3})O_3$ is $Ba(Mg_{1/3}Ta_{2/3})O_3$, and $0<\alpha\leq 0.73$.

17. A dielectric composition for high frequencies as claimed in claim 11, wherein said $Ba(M^{II}_{1/3}M^V_{2/3})O_3$ is $Ba(Zn_{1/3}Ta_{2/3})O_3$, and $0<\alpha\leq 0.76$.

18. A dielectric composition for high frequencies as claimed in claim 12, wherein said glass is $MgO\text{-}BaO\text{-}B_2O_3\text{-}SiO_2$—based glass which contains 20–50% by weight of MgO, 5–25% by weight of BaO, 15–30% by weight of $B_2O_3$, and 10–25% by weight of $SiO_2$, and said glass is added to said ceramic component at a rate of 2–30% by weight.

* * * * *